(12) United States Patent
Andersen et al.

(10) Patent No.: US 12,504,000 B2
(45) Date of Patent: Dec. 23, 2025

(54) CONTROLLING OPERATION IN DIFFERENT ZONES OF A WIND TURBINE

(71) Applicant: Vestas Wind Systems A/S, Aarhus N (DK)

(72) Inventors: Lars Rohrmann Andersen, Hadsten (DK); Johnny Nielsen, Svenstrup J (DK); Sten Dan Poulsen, Beder (DK); Peter Gjellerup Schiønning, Randers SV (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/271,768

(22) PCT Filed: Jan. 11, 2022

(86) PCT No.: PCT/DK2022/050004
§ 371 (c)(1),
(2) Date: Jul. 11, 2023

(87) PCT Pub. No.: WO2022/156867
PCT Pub. Date: Jul. 28, 2022

(65) Prior Publication Data
US 2024/0068444 A1    Feb. 29, 2024

(30) Foreign Application Priority Data
Jan. 20, 2021    (DK) .......................... PA 2021 70025

(51) Int. Cl.
*F03D 7/04*    (2006.01)
*F03D 7/02*    (2006.01)
*F03D 80/00*    (2016.01)

(52) U.S. Cl.
CPC ............ *F03D 7/048* (2013.01); *F03D 7/0264* (2013.01); *F03D 80/001* (2023.08); *F05B 2270/80* (2013.01)

(58) Field of Classification Search
CPC ...... F03D 7/048; F03D 7/0264; F03D 80/001; F03D 17/00; F03D 80/50; F05B 2270/80; F05B 2270/804
See application file for complete search history.

(56) References Cited

U.S. PATENT DOCUMENTS 6,720,874 B2 *   4/2004   Fufido ................. G08B 13/183
                                                                    340/556
9,082,099 B1 *   7/2015   Kolchin ............... G06Q 10/083
(Continued)

FOREIGN PATENT DOCUMENTS

| KR | 20130026101 A | 3/2013 |
|---|---|---|
| WO | 2019030133 A1 | 2/2019 |
| WO | 2020030235 A1 | 2/2020 |

OTHER PUBLICATIONS

Machine Translation of Description of KR 2013 0026101 A (Year: 2013).*

(Continued)

*Primary Examiner* — Pedro J Cuevas
(74) *Attorney, Agent, or Firm* — Wood Herron & Evans LLP

(57) ABSTRACT

The invention provides a computer-implemented method of controlling operation of a wind turbine in which a plurality of wind turbine zones are defined. The method comprises, for each of the plurality of wind turbine zones: receiving sensor data from at least one electromagnetic radiation sensor arranged to monitor the respective wind turbine zone; and, determining, based on the received sensor data, whether one or more people are in the respective wind turbine zone. The method comprises selecting an operational mode of the (Continued)

wind turbine based on the determination as to which of the plurality of zones have one or more people therein, and controlling the wind turbine to operate in the selected operational mode.

13 Claims, 5 Drawing Sheets

(56) References Cited

U.S. PATENT DOCUMENTS

| | | |
|---|---|---|
| 9,616,350 B2* | 4/2017 | Stenzler ............... G01J 1/0295 |
| 12,026,902 B2* | 7/2024 | Niebling ............. G06V 40/103 |
| 2002/0067259 A1* | 6/2002 | Fufidio .................. G07C 9/28 |
| | | 340/541 |
| 2009/0153656 A1 | 6/2009 | Sharonova |
| 2012/0070304 A1 | 3/2012 | Nielsen et al. |
| 2015/0336014 A1* | 11/2015 | Stenzler ............... G01J 1/0295 |
| | | 472/137 |
| 2016/0201648 A1 | 7/2016 | Steele et al. |
| 2019/0048851 A1 | 2/2019 | Hoffmann et al. |
| 2020/0160682 A1 | 5/2020 | Johnson et al. |

OTHER PUBLICATIONS

Danish Patent and Trademark Office, examination report issued in corresponding Danish Application No. PA 2021 70025, dated Jul. 1, 2021.
International Searching Authority, International Search Report and Written Opinio issued in corresponding PCT Application No. PCT/DK2022/050004. mailed Apr. 19, 2022.

* cited by examiner

CONTROLLING OPERATION IN DIFFERENT ZONES OF A WIND TURBINE

FIELD OF THE INVENTION

The invention relates to controlling operation of a wind turbine and, in particular, to controlling operation of the wind turbine based on a determination as to which of a plurality of zones defined in the wind turbine one or more people are detected.

BACKGROUND

Wind turbine control technology is used for optimisation of power and minimisation of loads. However, operation of a wind turbine may also need to be controlled for other reasons, for instance for reasons of safety during periods of maintenance, e.g. when a number of operators may be located in and around the wind turbine. In particular, a wind turbine has many different components that have the potential to cause harm to people in the vicinity of them, for instance because they have moving parts and/or because they are electrified. However, for reasons of power production efficiency, it may be undesirable to completely shut down operation of a wind turbine when operators are present in its vicinity to perform inspection or repairs. Instead, it may be preferable that the wind turbine operates in a safe mode of operation and/or one or more components that operators will be in the vicinity of are disabled or operated at a reduced level.

Known techniques include the provision of a mode selector system at or within a wind turbine. When a person arrives on site at the wind turbine, they may need to manually move a switch to identify their presence at the wind turbine. Operation of the wind turbine may then be modified when the mode selector is switched. Such mode selectors may be located at a ground control panel and/or a nacelle control panel of the wind turbine. Although a mode selector system makes it possible to identify when one or more people are present in the wind turbine, it does not allow the possibility of identifying where in the turbine people are present. It also relies on a person remembering to switch the mode selector on arrival at the wind turbine. There is also a potential disadvantage that a person may switch a mode selector if they are unaware of another person's presence in the wind turbine, which could have safety implications.

Other known techniques include monitoring hatch doors located around a wind turbine, and controlling operation of the wind turbine accordingly. For instance, when it is detected that a hatch door has been opened—i.e. indicating that a person is present—a component of the wind turbine in the vicinity of the hatch door may automatically be shut down or disabled in order to protect the detected person. Such a technique may be disadvantageous in that a number of switches—with associated contacts and wiring—may need to be installed throughout the wind turbine for each hatch, which could be costly and potentially unreliable. Also, in order that a component may be restarted—e.g. after maintenance has been completed—the person that has been in the vicinity of the component needs to remember to manually actuate a switch, which is located away from the component to ensure that the person is no longer in the vicinity of the component. Again, therefore, power production efficiency of the wind turbine may be reduced if someone forgets to restart a component via such a switch, or there could be a potential safety issue if another person operates the switch to restart the component in a case where they are unaware that someone is in the vicinity of the component. Furthermore, such a system is limited to detecting people in the vicinity of the hatch doors of a wind turbine.

It is against this background to which the present invention is set.

SUMMARY OF THE INVENTION

According to an aspect of the invention there is provided a computer-implemented method of controlling operation of a wind turbine in which a plurality of wind turbine zones are defined. The method comprises, for each of the plurality of wind turbine zones: receiving sensor data from at least one electromagnetic radiation sensor arranged to monitor the respective wind turbine zone; and, determining, based on the received sensor data, whether one or more people are in the respective wind turbine zone. The method comprises selecting an operational mode of the wind turbine based on the determination as to which of the plurality of zones have one or more people therein, and controlling the wind turbine to operate in the selected operational mode.

In some examples, when a change is determined from one or more people being in at least one of the wind turbine zones to no people being in any of the wind turbine zones, an operational mode may be selected in which operation of the wind turbine is started. Alternatively, when such a condition is satisfied, an operational mode may be selected in which operation of the wind turbine is stopped.

In some examples, when a change is determined from one or more people being in one of the wind turbine zones to no people being in said wind turbine zone, an operational mode may be selected in which operation of a wind turbine component in said wind turbine zone is changed, e.g. started or stopped.

In some examples, the selected operational mode may be a mode in which operation of the wind turbine component is started. Optionally, the selected operational mode may be a mode in which motion of the wind turbine component is permitted.

In some examples, when it is determined that one or more people are in said wind turbine zone, the selected operational mode may be a mode in which the wind turbine component in said wind turbine zone operates in a safe mode. Optionally, the safe mode may involve disabling operation of the wind turbine component.

In some examples, when it is determined that one or more people are in one or more of the wind turbine zones, the method may comprise preventing manual selection of one or more of the operational modes of the wind turbine, determined based on the determination as to which of the plurality of zones have one or more people therein, by an operator on site at the wind turbine.

In some examples, when it is determined that one or more people are in one or more of the wind turbine zones, the method may comprise preventing implementation of one or more of the operational modes of the wind turbine, determined based on the determination as to which of the plurality of zones have one or more people therein, by a control signal received from a wind turbine controller that is remote from the wind turbine.

The method may comprise determining, for at least one of wind turbine zones, an identity of one or more people in the respective wind turbine zone based on the received sensor data. The method may comprise selecting the operational mode of the wind turbine based on the determination as to the identity of the one or more people.

In some examples, determining the identity of one of the people in one of the wind turbine zones may comprise determining whether said one of the people is authorised to be in said wind turbine zone. The method may comprise selecting the operational mode of the wind turbine based on the determination as to whether said one of the people is authorised.

The method may comprise determining, for at least one of the wind turbine zones, an activity being performed by one or more people in the respective wind turbine zone based on the received sensor data. The method may comprise selecting the operational mode of the wind turbine based on the determination as to the activity being performed by the one or more people.

The received sensor data may include data relating to a shape or movement of a detected body. The determination as to whether one or more people are in the respective wind turbine zone may comprise determining whether the detected body is a person.

The electromagnetic radiation sensors may be radar sensors or LI DAR sensors.

The plurality of wind turbine zones may include one or more of:
an area at the bottom of a tower of the wind turbine;
an area at an entrance of the tower;
a yaw area of the wind turbine;
an area at the front of a nacelle of the wind turbine, for instance an area adjacent to, or behind, a rotor of the wind turbine;
an area at the rear of the nacelle, for instance, an area in the vicinity of, or adjacent to, electrical equipment of the wind turbine, such as a converter or a transformer;
an area at a roof of the nacelle;
a hub area of the wind turbine; and,
an area inside or outside of a blade of the wind turbine.

The method may be implemented by a safety control system of the wind turbine separate from a main control system of the wind turbine. The main control system may control operation of the wind turbine when it is determined that there are no people in the wind turbine zones. The method may comprise, when it is determined that one or more of the wind turbine zones have one or more people therein: controlling the safety control system to assume control of the wind turbine from the main control system; and, transmitting a control signal to control the wind turbine to operate in the selected operational mode. Alternatively, the method may comprise controlling the safety control system to assume control of the wind turbine from the main control system when a person is detected to have left/exited one of the wind turbine zones.

According to another aspect of the invention there is provided a non-transitory, computer-readable storage medium storing instructions thereon that when executed by a processor cause the processor to perform the method described above.

According to another aspect of the invention there is provided a control system for controlling operation of a wind turbine in which a plurality of wind turbine zones are defined. The control system comprises, for each of the plurality of wind turbine zones, at least one electromagnetic radiation sensor arranged to monitor the respective wind turbine zone. The control system comprises a controller including an input, a processor and an output. The input is configured to receive sensor data from the electromagnetic radiation sensors. The processor is configured to: for each of the plurality of wind turbine zones, determine, based on the received sensor data, whether one or more people are in the respective wind turbine zone; and, select an operational mode of the wind turbine based on the determination as to which of the plurality of zones have one or more people therein. The output is configured to transmit a control signal to control the wind turbine to operate in the selected operational mode.

The control system may be a safety control system separate from a main control system of the wind turbine. The main control system may be configured to control operation of the wind turbine in the absence of the output of the safety control system transmitting the control signal. When the output of the safety control system transmits the control signal upon determination that one or more of the wind turbine zones have one or more people therein, the safety control system may be configured to assume control of the wind turbine from the main control system.

According to another aspect of the invention there is provided a wind turbine comprising a control system as described above.

BRIEF DESCRIPTION OF THE DRAWINGS

Examples of the invention will now be described with reference to the accompanying drawings, in which.

DETAILED DESCRIPTION

Figure 1:
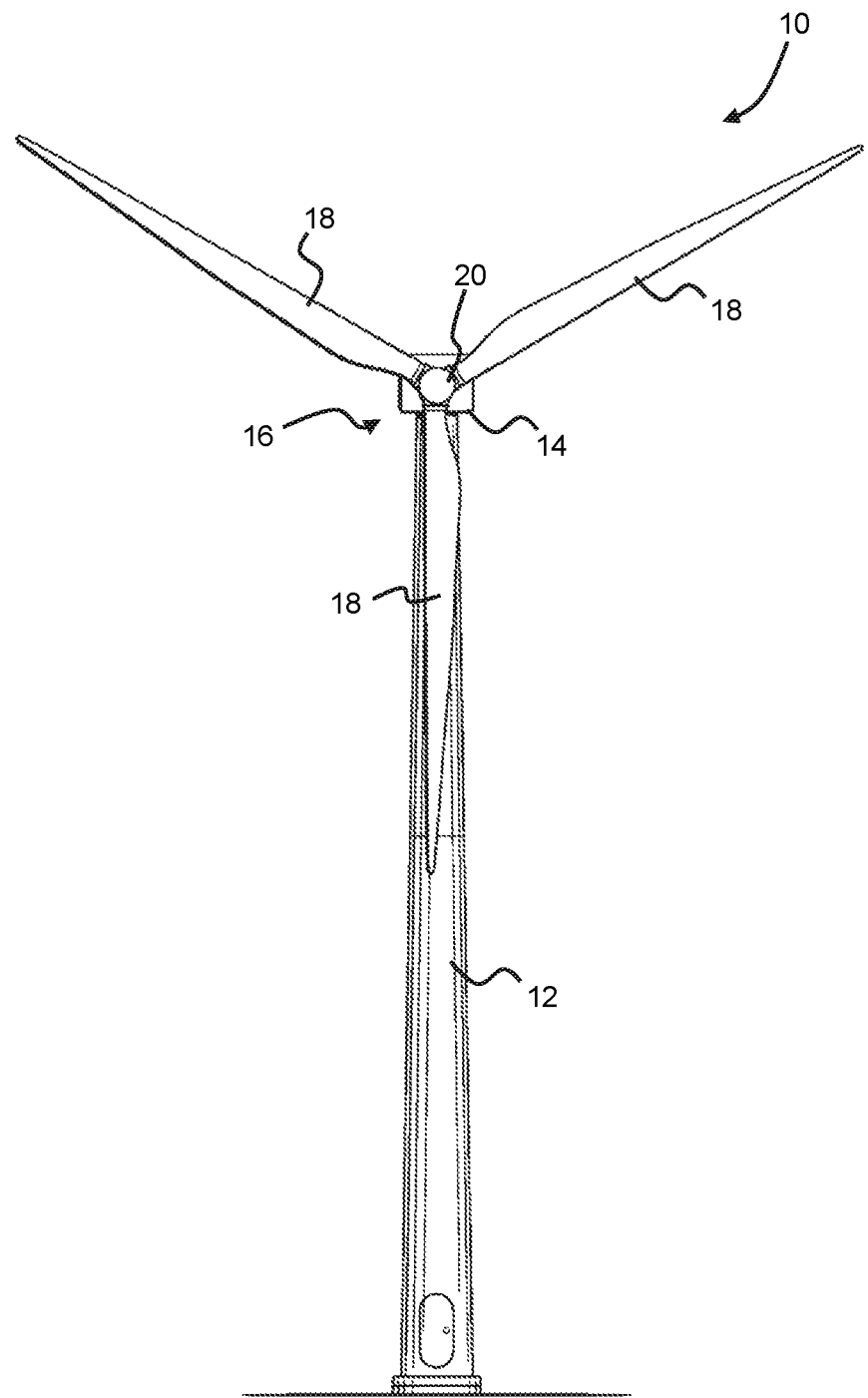
FIG. 1 is a schematic view of a wind turbine in accordance with an example of the invention.

FIG. 1 shows a wind turbine 10 in which an example of the invention may be incorporated. The wind turbine 10 comprises a tower 12 supporting a nacelle 14 to which a rotor 16 is mounted. The rotor 16 comprises a plurality of wind turbine blades 18 that extend radially from a hub 20. In this example, the rotor 16 comprises three blades 18 and a single rotor 16, although other configurations including any suitable number of blades and rotors are possible.

At any given time, there may be a number of people, e.g. operators, engineers, etc., located in various places all over the wind turbine 10. For instance, this could be to perform routine inspections, maintenance, repairs, etc. When the wind turbine 10 is operating to generate electricity while people are present in or around the turbine 10, then there is a potential safety risk that one or more of the components of the wind turbine 10 could cause harm to a person in its vicinity. For instance, moving parts of the wind turbine 10 such as the rotor 16 could be a safety risk to a person who is close by while the rotor 16 is rotating. Also, high-voltage (HV) equipment of the wind turbine 10, such as a transformer located in the nacelle 14, could pose a safety risk to a person who is nearby while such HV equipment is on.

An aim of the invention is to detect not only when one or more people are in or around the wind turbine 10, but also to detect where in the wind turbine 10 the people are. This is in order to reduce safety risks for people in the wind turbine 10, and also to maximise the power producing capability of the wind turbine 10 while people are on site at the wind turbine 10.

To achieve this, a number of different zones or areas are defined in or around the wind turbine 10. The number and location of the different wind turbine zones can be defined as desired, for instance depending on which parts of the turbine 10 it is desired to monitor whether people are present, and optionally depending on resources needed to perform such monitoring. It may be desired to monitor the presence of people in certain areas of the wind turbine 10 because those areas pose a particular safety risk, because those areas may readily be monitored, and/or because those areas are the most likely for people at the wind turbine 10 to be located, for instance. Purely for illustrative purposes, one or more of the wind turbine zones may be located or defined at an area at the bottom, the top, and/or an entrance, of the wind turbine tower 12. One or more of the wind turbine zones may be located or defined at an area at the front, the rear, and/or on/at the roof, of the nacelle 14. Also, one or more of the wind turbine zones may be located or defined at a yaw area of the wind turbine 10 (i.e. an area where components for controlling the yaw angle of the wind turbine 10 are located), a hub area of the wind turbine 10, and/or an area inside or outside of one or more of the blade 18 of the wind turbine 10.

To monitor whether people are present in the various wind turbine zones, each zone is provided with one or more electromagnetic radiation sensors (either in or near the zone) to scan and monitor the respective zone. The sensors could be any suitable type of electromagnetic radiation sensors, such as cameras (vision sensors), infrared/radar sensors, acoustic/ultrasound sensors, LIDAR sensors, etc., or any combination thereof. For instance, radar or LIDAR sensors may be chosen as they generally require less processing power than cameras. This may be significant if several such sensors are to be provided in or around the wind turbine 10, and/or if the sensor data provided by the sensors is to be processed locally on site at the wind turbine or wind farm (where available computing resources are likely to be limited), rather than at a remote controller or computing device (where greater computing resource is likely to be available). Radar and/or LIDAR sensors may also be beneficial in that can operate in different light conditions, and in that they allow distances, e.g. between a person and an object, to be determined. On the other hand, cameras may be considered to be beneficial in that could allow for face recognition of detected personnel in the wind turbine.

The different wind turbine zones could be defined by the number and positioning of the electromagnetic radiation sensors. That is, an area or region of the (interior or exterior of the) wind turbine 10 that is within a monitoring range of a particular sensor (or particular sensors) could be defined as a particular one of the wind turbine zones. However, it will be understood that the different wind turbine zones can be defined in any suitable manner.

The sensors are arranged to receive appropriate electromagnetic radiation signals indicative of part or all of the areas/regions covered by the respective wind turbine zones. The sensors may continuously receive signals from their surroundings, or they may be arranged to receive signals periodically or at set times, for instance. Sensor data indicative of the collected signals is transmitted to a processor for analysis. Again, this may be performed continuously or periodically, or in any other suitable manner.

The processor performs appropriate analysis—depending on the type of electromagnetic radiation sensors that are being used—to determine whether there are any people present in any of the wind turbine zones for which sensor data has been received. For instance, if cameras are being used then the processor may perform face recognition or body recognition in order to guard against moving objects other than people being falsely detected as people. If LIDAR, infrared or ultrasonic sensors are used, then the processor may analyse the size and/or movement of a detected object/body to accurately identify people rather than other objects. Optionally, magnetic field sensors could be utilised, and the corresponding sensor data could also be analysed based on the size of a detected body to identify whether or not it is a person. A light curtain could be used in a similar way to detect moving objects in a wind turbine zone. Also, when acoustic sensors are used then the received sound data may be analysed to detect noises indicative of people talking or moving around. The received sensor data could include data from a number of different types of sensors, and analysis of one type of received sensor data could be analysed against another type of sensor data to verify determinations and reduce the number of false positives identifying the presence of humans in the wind turbine zones. For instance, people may identify themselves as being present in a particular wind turbine zone via the use of an RFID (radio-frequency identification) tag or other similar identification method, and this could be used to verify the presence of people detected via data received from a different type of sensor.

The determination by the processor as to whether people have been detected in the wind turbine and, in particular, the specific zone(s) in which people have been detected, is used to inform the processor in the selection of a certain operational mode in which the wind turbine 10 is to be controlled. That is, the selection of an operational mode to be utilised is made dependent on which of the plurality of zones at least one person has been detected in.

Figure 2:
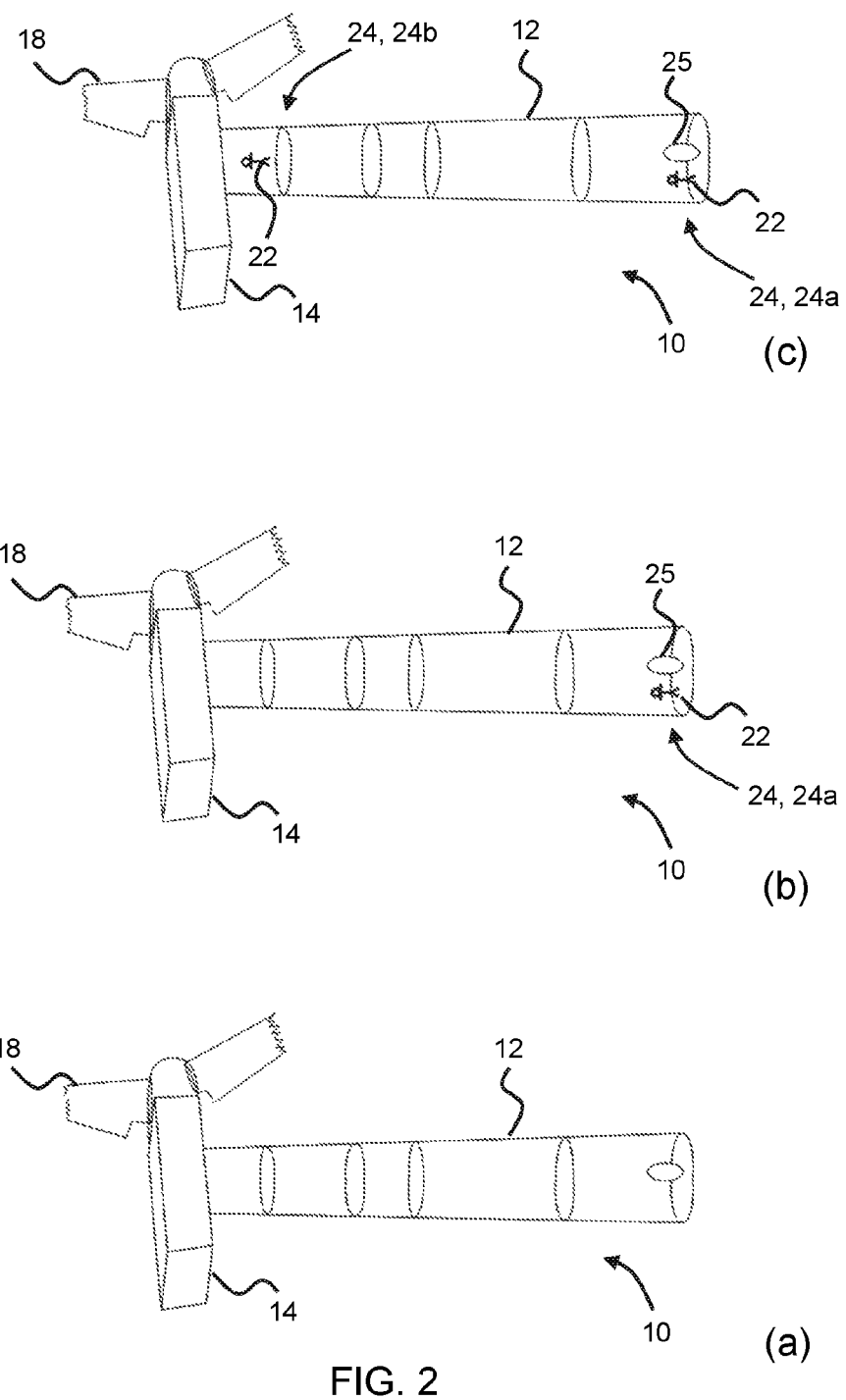
FIGS. 2(a)-2(e) show views of the wind turbine of FIG. 1, each view illustrating zero, one or more people located in one or more different zones defined in the wind turbine.
Figure 2:
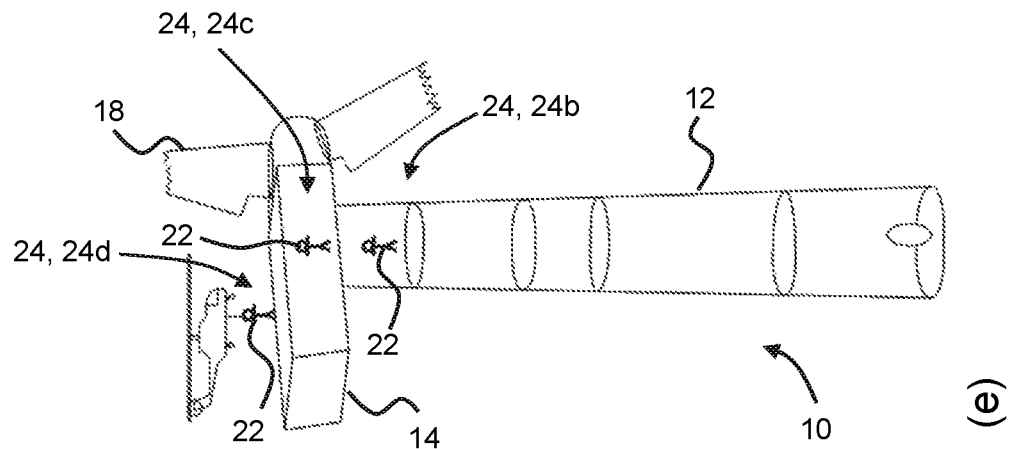
Figure 2:
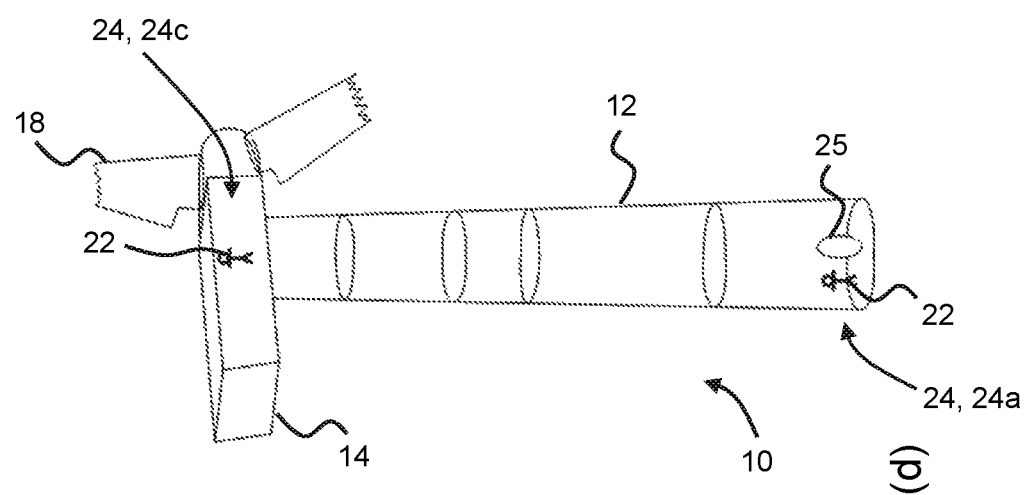

FIG. 2 schematically illustrates various examples of people 22 being present in different zones 24 of the wind turbine 10. FIG. 2(a) illustrates an example in which no people are detected in any of the wind turbine zones, i.e. no people are detected as being in or around the wind turbine 10. In such an example, normal operation of the wind turbine 10 may be utilised, i.e. the operation of one or more components of the wind turbine 10 do not need to be modified or shut down for reasons of safety to on-site personnel.

FIG. 2(b) illustrates an example in which a person 22 is detected as being present in a wind turbine zone 24a that is defined in the wind turbine tower 12. The particular example illustrates the person 22 being at a bottom part of the tower 12, adjacent to an entrance of the tower 12. The wind turbine zone 24a may be defined as encompassing just the area adjacent to the entrance 25, an area generally covering all of a lower part of the tower 12, an area covering generally the entire tower 12, or any other suitable area of the tower 12. When the person 22 is detected as being present in the wind turbine zone 24a by analysis of sensor data from the one or more electromagnetic sensors arranged to monitor the wind turbine zone 24a, an operational mode may be selected that is simply suitable for the case in which a person is present in the wind turbine 10. For instance, such an operational mode may involve enabling a mechanical brake of the wind turbine 10 to cause an emergency shut down of the wind turbine operation.

FIG. 2(c) illustrates an example in which, similarly to FIG. 2(b), a person 22 is detected as being present in the wind turbine zone 24a in the tower 12 and, in addition, a further person 22 is detected as being present in a wind turbine zone 24b defined at, or to include, a yaw platform of the wind turbine 10. When the people 22 are detected as being present in both the wind turbine zones 24a, 24b by analysis of sensor data from the electromagnetic sensors arranged to monitor said wind turbine zones 24a, 24b, an operational mode may be selected in which the wind turbine mechanical brake is applied, and in which a yaw system of the wind turbine is stopped or disabled (as long as people are detected in the wind turbine zone 24b). By halting the wind turbine yaw system, there may be a reduced chance of accident for those people 22 in the wind turbine zone 24b that could be caused by moving/rotating parts of the yaw system.

FIG. 2(d) illustrates an example in which, similarly to FIG. 2(b), a person 22 is detected as being present in the wind turbine zone 24a in the tower 12 and, in addition, a further person 22 is detected as being present in a wind turbine zone 24c defined in the wind turbine nacelle 14. In particular, a person 22 is detected as being in front of a converter located in the nacelle 14 of the wind turbine 10. When the people 22 are detected as being present in both the wind turbine zones 24a, 24c by analysis of the received sensor data, an operational mode may be selected in which the wind turbine mechanical brake is applied, and in which operation of the converter is stopped or disabled. By halting the wind turbine converter, there may be a reduced chance of accident for those people 22 in the wind turbine zone 24c that could be caused by the relatively high voltages associated with the converter in use.

FIG. 2(e) illustrates an example in which people 22 are detected in each of the wind turbine zones 24b, 24c, and a further person 22 is detected as being present in a wind turbine zone 24d defined on a roof of the wind turbine nacelle 14, e.g. at a helipad on top of the nacelle 14. When the people 22 are detected as being present in each of the wind turbine zones 24b, 24c, 24d by analysis of the received sensor data, an operational mode may be selected in which the wind turbine mechanical brake is applied, the yaw system is stopped, and the converter is stopped. It will be understood that FIGS. 2(a) to 2(e) are merely examples of different combinations of zones in which people may be detected, and further different zones and combinations are envisaged as being possible.

Figure 3:
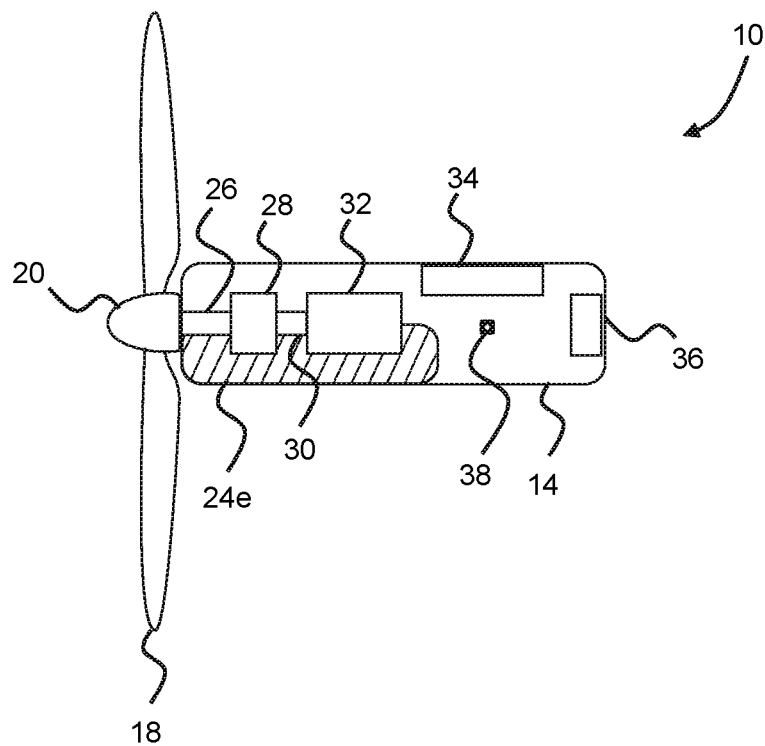
FIG. 3 shows a top view of the wind turbine of FIG. 1, including components in a nacelle of the wind turbine; and, FIG. 4 shows the steps of a method for controlling operation of the wind turbine of FIG. 1.

A further example of how the people detection method may be implemented is described with reference to FIG. 3. FIG. 3 shows a top view of the wind turbine 10, in particular indicating components inside the nacelle 14. A main/rotor shaft 26 extends between the rotor 20 and a gearbox 28, and a generator shaft 30 extends between the gearbox 28 and a generator 32 of the wind turbine 10. The nacelle 14 also houses the converter 34 and the transformer 36 towards the rear side of the nacelle 14.

The nacelle 14 includes an electromagnetic radiation sensor 38 arranged to monitor a zone 24e defined towards a front side of the nacelle 14. In the described example, the zone 24e extends from an area adjacent/behind the rotor 20 along one side of the main shaft 26, gearbox 28, generator shaft 30 and generator. It will be understood that this zone 24e can be defined in any suitable manner, for instance extending along both sides of the main shaft 26 and/or not extending as far back from the rotor side of the nacelle 14 as the generator 32.

In one example, in order to perform maintenance of the wind turbine 10, the rotor 20 needs to be rotated to a specific position so that it can be locked/clamped in place. It is difficult or impossible to put the rotor in the correct place remotely, and so an operator may need to be positioned behind the rotor 20 to ensure the rotor correctly lines up with the rotor lock, for instance. The operator may therefore need to be in the wind turbine zone 24e to do this.

It may be the case that there are relatively low levels of wind when the rotor 20 is to be locked for wind turbine maintenance such that the rotor will not move. However, it is also the case that in conventional systems the rotor cannot be operated when an operator is present in the wind turbine 10. Hence, in one example, the presently-implemented method may allow for operation of the rotor 20 to start or continue when an operator is detected as being present in the defined zone 24e near to the rotor 20 towards the front of the nacelle 14 in order that they can position the rotor 20 correctly for locking. In this way, operation of at least part of the wind turbine 10 is permitted when an operator is detected in this zone 24e. However, in this example, if the operator is then detected as leaving the zone 24e—which may correspond with the operator entering another of the wind turbine zones 24, e.g. in the vicinity of the converter 34 and/or transformer 36 towards the rear of the nacelle 14—then operation of the rotor 20, of one of the other wind turbine components (e.g. converter 34), or the entire wind turbine 10, may be shut down. For instance, this could guard against the operator coming into contact with any of the high-voltage (HV) equipment so as to reduce the safety risk. In this way, the shut-down of certain components may be triggered by the detection of personnel leaving a define zone, as well as entering a zone.

In some examples of the invention, in addition to determining which wind turbine zones 24 have people 22 located therein, a determination as to an identity of one or more of the people 22 detected in the wind turbine zones 24 may also be made. For instance, authorised personnel may have RFID tags that are scanned to reveal their identity and presence in a particular wind turbine zone. Alternatively, the identity determination may be performed by performing face recognition processing on the received sensor data, and comparing the received data to a data store of data relating to known/authorised personnel. It will be understood that determining an identity of a person in one of the wind turbine zones may be performed in any other suitable manner.

The selection of the operational mode in which the wind turbine 10 is to be operated may then depend on the determined identity of one or more detected people 22 in the wind turbine zones 24. For instance, it may be that the selection of an operational mode is different depending on whether or not a detected person is identified as a person who is authorised to be in a particular one of the wind turbine zones 24. It may be that only more senior operators are permitted to be in certain zones 24 of the wind turbine 10. If an unauthorised person 22 is determined to be in one of the zones 24, then an operational mode in which wind turbine components in said zone 24 are shut down may be selected, or it may be that operation of the entire wind turbine 10 is shut down. Alternatively, or in addition, a warning signal may be raised if an unauthorised person is identified as being in one of the wind turbine zones 24.

In some examples of the invention, in addition to determining which wind turbine zones 24 have people 22 located therein, a determination as to an activity being performed by one or more of the detected people 22 may also be made. For instance, it may be determined whether a person 22 is simply moving through a particular wind turbine zone 24 or whether they are performing maintenance in the zone 24. A determination as to whether a detected person 22 is performing an authorised action, e.g. authorised maintenance, may be made. An activity being performed may be determined in any suitable way. For instance, the movement of a detected person 22 may be analysed using the received sensor data, one or more controls being operated in a given zone 24 may be detected, and/or the specific position of a person 22 in a particular zone 24 may be analysed.

The selection of the operational mode in which the wind turbine 10 is to be operated may then depend on the determined activity being performed by the detected people 22 in the wind turbine zones 24. For instance, it may be that if it is determined that a person 22 is simply passing through a zone 24, then there is no need to select an operational mode in which a wind turbine component in said zone is disabled or enters a safe mode. On the other hand, if it determined that an operator 22 is performing maintenance in a certain zone 24, then an operational mode may be selected in which a wind turbine component in said zone 24 is disabled.

Figure 4:
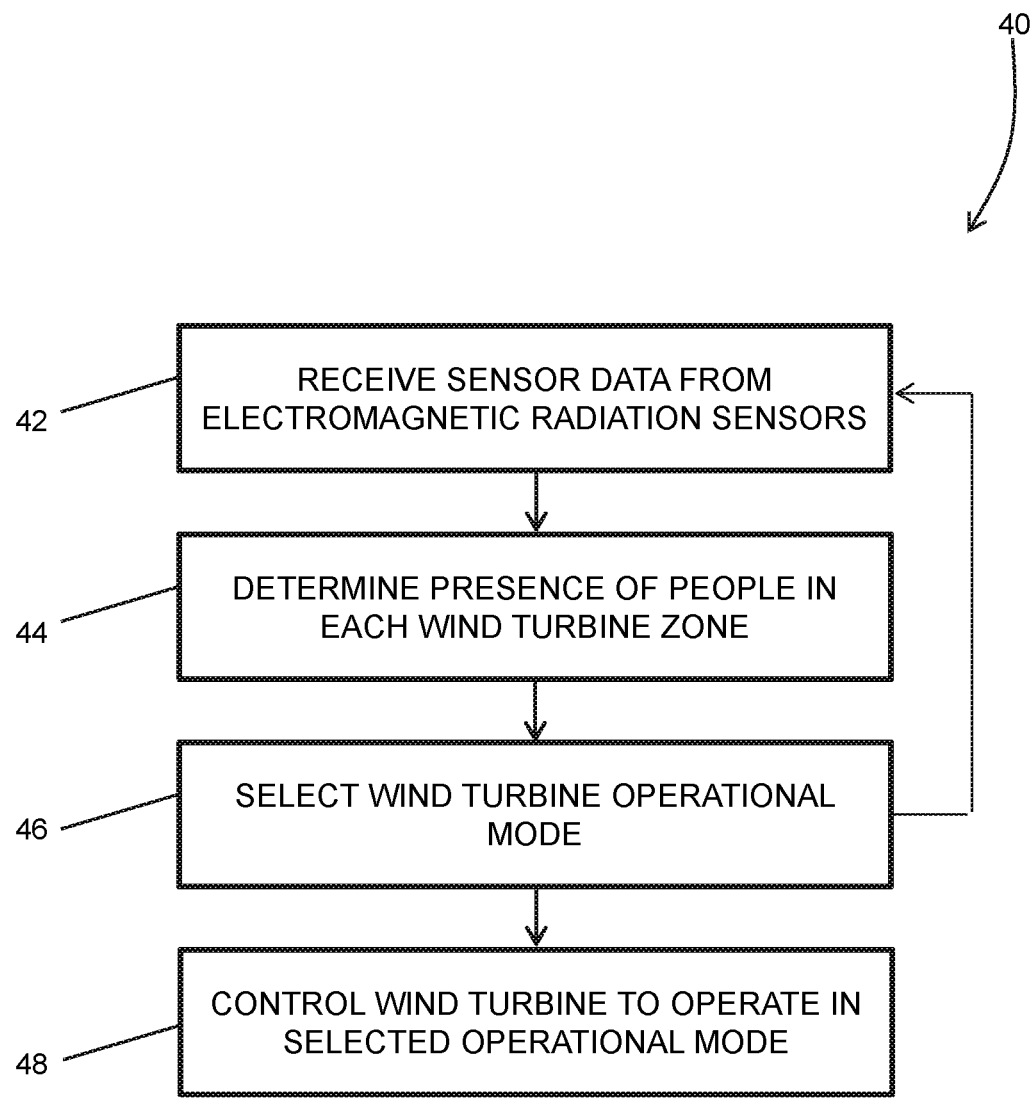

FIG. 4 summarises the steps of a computer-implemented method 40 for operating the wind turbine 10 in accordance with an example of the invention. At step 42, a controller or computing device that implements the method 40 receives sensor data relating to one or more of the defined wind turbine zones 24. In particular, for a given wind turbine zone 24, sensor data is received from the one or more electromagnetic radiation sensors arranged to monitor said wind turbine zone 24. The controller may receive sensor data from the sensors of all or some of the wind turbine zones 24 at a given time, and the sensors may be arranged to transmit data to the controller continuously, periodically, or in any other suitable manner.

At step 44, for each wind turbine zone 24 for which sensor data has been received, it is determined, based on the received sensor data, whether one or more people 22 are in the respective wind turbine zone. To make this determination, the controller processes the received sensor data in dependence on the specific type of electromagnetic radiation sensors that are be used to monitor the zones. For instance, if LIDAR, infrared or ultrasonic sensors are used, then the controller may analyse the size and/or movement of a detected object/body to identify whether it is a person 22.

At step 46, an operational mode of the wind turbine 10 is selected based on the determination as to which of the plurality of wind turbine zones have at least one person located therein. For instance, with reference to FIG. 2, the operational mode may be selected depending on which combination of the wind turbine zones 24 one or more people 22 have been detected. The selected operational mode may simply correspond to shutting down wind turbine components located in those zones 24 in which at least one person 22 has been detected (e.g. a safe mode), or may be selected in a different manner. The operational mode may additionally be selected depending on a determination of a specific identity of a person 22 in one of the zones 24.

When it is determined that people 22 are in one or more of the wind turbine zones 24, it may also be the case that manual selection of one or more of wind turbine operational modes are prevented. That is, an operator on site at the wind turbine 10 may not be able to manually select certain operational modes based on the determination as to which of the plurality of zones 24 have one or more people 22 therein. In this way, an operator may be prevented from inadvertently starting a component of the wind turbine 10 if they are unaware that another operator 22 is in the vicinity of said component, i.e. in the zone 24 in which the component is located. For instance, a control signal may be sent from a controller remote from the wind turbine 10 to disable the possibility of an operator on site at the turbine 10 manually selecting certain operational modes, based on the determination as to which wind turbine zones 24 people 22 are located.

At step 48, the wind turbine 10 is controlled to operate in the selected operational mode. For instance, the controller implementing the method 40 may send a control signal to cause the wind turbine 10 to operate in the selected operational mode. This may involve sending a control signal to control one or more components of the wind turbine 10 to operate in a certain manner, e.g. disabling a certain component (for instance, by switching it off or locking it), changing blade pitch angle, changing yaw angle, etc. The signal to control components in this manner may be transmitted by the computing device performing the method 40, or may be transmitted by a separate control system for causing the wind turbine 10 to operate in a particular operational mode (which has itself been instructed by the computing device implementing the method 40).

The steps 42, 44 and 46 of the method 40 may be repeated, for instance continuously or periodically, to update which operational mode the wind turbine 10 is controlled to operate in. As described above, the detection of people 22 in the wind turbine zones 24 may be used to base a decision to shut down certain components of the wind turbine 10, e.g. for safety reasons. This may be equivalent to controlling these certain components to operate in a safe mode. Equally, however, when a change is determined from a situation in which one or more people 22 are in one of the wind turbine zones 24 to no people being in said zone 24, an operational mode may be selected in which operation of components in said zone 24 are (re)started. In this way, when it is determined that people 22 have left or vacated a particular wind turbine zone 24, components in said zone may automatically be restarted and resume normal operation without needing further manual input from an operator to indicate that normal operation can resume. This increases operational efficiency of the wind turbine 10, as wind turbine components are automatically restarted as soon as it is safe to do so, thereby minimising the down time of said components.

More generally, therefore, when a change is determined from one or more people 22 being in one of the wind turbine zones 24 to no people being in said wind turbine zone 24, an operational mode may be selected in which operation of a wind turbine component in said wind turbine zone 24 is changed, e.g. (re)started.

The method of the invention may be implemented on any suitable computing device, for instance by one or more functional units or modules implemented on one or more computer processors. Such functional units may be provided by suitable software running on any suitable computing substrate using conventional or customer processors and memory. The one or more functional units may use a common computing substrate (for example, they may run on the same server) or separate substrates, or one or both may themselves be distributed between multiple computing devices. A computer memory may store instructions for performing the method, and the processor(s) may execute the stored instructions to perform the method. The computing device and/or memory may be partly or wholly located on site at the wind turbine or remote from the wind turbine.

The method of the invention may be implemented by a safety controller or control system of the wind turbine 10. In particular, such a safety control system is separate from a main controller or control system of the wind turbine 10. Specifically, the main control system controls operation of the wind turbine 10—including starting and stopping the turbine—under all normal foreseeable operating conditions, including extreme winds and most detected fault conditions. For instance, the main control system may control blade pitch, generator speed, etc. of the wind turbine 10 based on detected wind conditions in order to maximise the energy captured by the wind turbine 10 whilst minimising loads.

The safety control system operates in the background (e.g. including collecting and processing data from the electromagnetic radiation sensors) and may be configured to assume control from, or override, the main control system in certain situations. For instance, if a mode selector control located on site at the wind turbine 10 is actuated manually by an operator then the safety control system may override normal control instructions from the main control system to instruct an emergency shutdown of the wind turbine 10, or one or more of its components. Alternatively, the safety control system may intervene when there is rotor overspeed, when a vibration sensor trips, or for any other faults indicating that the main control system is unable to control the wind turbine in a safe manner. In general, the function of the safety control system may be to detect a serious, or potentially serious, problem with the wind turbine, and to bring the wind turbine to a safe condition, e.g. bringing the wind turbine to rest with the brakes applied, when the main control system fails to perform this function.

In one example of the present invention, the safety control system may receive and monitor the electromagnetic radiation sensor data to detect whether there are people in any of the wind turbine zones 24. Indeed, the electromagnetic radiation sensors may be dedicated safety control system sensors. When it is determined that there is no-one present in any of the zones 24, the main control system may continue to control operation of the wind turbine 10 in the normal manner. However, when the safety control system determines the presence of people in one or more of the wind turbine zones 24, then the safety control system may be configured to override the main control system, and to control the wind turbine 10 to operate in the operational mode selected by the safety control system.

Many modifications may be made to the above-described examples without departing from the spirit and scope of the invention as defined herein with particular reference to the appended claims.

Examples and embodiments of the present invention are advantageous in that detection of personnel in a wind turbine may be performed in a simple, flexible and reliable manner, and that operation of the wind turbine may be controlled automatically and autonomously based on the location, and optionally the identity or performed activity, of the detected personnel. Beneficially, the invention does not require the provision of switches (and associated wiring) to determine the presence of people in the wind turbine. Furthermore, the electromagnetic radiation sensors can be located and oriented to monitor certain areas of the wind turbine, as desired. In this way, the invention is not restricted to detecting the presence of personnel at only specific locations according to the layout of the wind turbine, e.g. at hatches of the wind turbine.

Examples and embodiments of the invention are advantageous in that they maximise operating efficiency (e.g. wind energy capture) of the wind turbine while improving the safety level of the wind turbine by avoiding the need for manual operator input. In particular, by automatically controlling one or more wind turbine components to be disabled or enter a safe mode when a person is detected as being in the vicinity of the component, there is no need for an operator to remember to manually shut down the component prior to entering the area in its vicinity. Also, by preventing manual start-up of wind turbine components while it is detected that a person is still in its vicinity, prevention of accidents by inadvertent action or misuse by a different operator is achieved. In addition, by automatically controlling one or more wind turbine components to restart (or resume normal operation) when all personnel are detected as having left the vicinity of the component, there is no risk that the component is disabled for a longer period than is necessary (which may occur if an operator needs to remember to manually reset a switch to restart a component), and so wind turbine efficiency is maximised. Note that a system that requires monitoring the opening of hatches cannot be used to automatically restart turbine components because a closed hatch does not necessarily indicate whether a person is still in the vicinity of said components.

The invention claimed is:

1. A computer-implemented method of controlling operation of a wind turbine in which a plurality of wind turbine zones are defined, the method comprising, for each of the plurality of wind turbine zones:
   receiving sensor data from at least one electromagnetic radiation sensor arranged to monitor the respective wind turbine zone; and
   using the received sensor data, determining whether one or more people are in the respective wind turbine zone, the method further comprising:
      controlling the wind turbine to operate in a first operational mode when it is determined that one or more people are in at least one of the plurality of wind turbine zones, the first operational mode configured such that no electrical power is being produced by the wind turbine, and
   controlling the wind turbine to operate in a second operational mode when a change is determined from one or more people being in at least one of the plurality of wind turbine zones to no people being in any of the plurality of wind turbine zones, the second operational mode being configured such that the wind turbine generates electrical power.

2. The method according to claim 1, wherein when a change is determined from one or more people being in one of the plurality of wind turbine zones to no people being in the one of the plurality of wind turbine zones, the first operational mode includes changing the operational state of a wind turbine component in the one of the plurality of wind turbine zones.

3. The method according to claim 2, wherein the first operational mode further includes changing the operational state of the wind turbine component from a disabled state to an operable state.

4. The method according to claim 2, wherein when it is determined that one or more people are in the one of the plurality of wind turbine zones, the first operational mode further includes changing the operational state of the wind turbine component from an operable state to a disabled state.

5. The method according to claim 1, wherein when it is determined that one or more people are in one or more of the plurality of wind turbine zones, the method comprises preventing manual selection of the first and second operational modes and/or the manual change an operating state of a wind turbine component in the one or more plurality of wind turbine zones by an operator on site at the wind turbine.

6. The method according to claim 1, further comprising;
   using the received sensor data, determining, for at least one of the plurality of wind turbine zones, an identity of one or more people in the at least one of the plurality of wind turbine zones, and
   using the identity of the one or more person, selecting the operational state of a wind turbine component in the at least one of the plurality of wind turbine zones.

7. The method according to claim 6, wherein determining the identity of one of the people in the at least one of the plurality of wind turbine zones comprises:
- determining whether the one of the people is authorised to be in the at least one of the plurality of wind turbine zones, and
- using whether the one of the people is authorized, selecting the operational state of a wind turbine component in the at least one of the plurality of wind turbine zones.

8. The method according to claim 1, the method comprising:
- using the received sensor data, determining, for at least one of the plurality of wind turbine zones, an activity being performed by one or more people in the at least one of the wind turbine zones, and
- using the activity being performed, selecting the operational state of a wind turbine component in the at least one of the plurality of wind turbine zones.

9. The method according to claim 1, wherein the plurality of wind turbine zones include one or more of:
- an area at the bottom of a tower of the wind turbine;
- an area at an entrance of the tower;
- a yaw area of the wind turbine;
- an area at the front of a nacelle of the wind turbine;
- an area at the rear of the nacelle;
- an area at a roof of the nacelle;
- a hub area of the wind turbine; and,
- an area inside or outside of a blade of the wind turbine.

10. The method according to claim 1, wherein the method is implemented by a safety control system of the wind turbine separate from a main control system of the wind turbine that controls operation of the wind turbine when it is determined that there are no people in the wind turbine zones, and
- the method comprising, when it is determined that one or more of the plurality of wind turbine zones have one or more people therein:
  - controlling the safety control system to assume control of the wind turbine from the main control system; and,
  - transmitting a control signal to control the wind turbine to operate in the first or second operational mode.

11. A control system for controlling operation of a wind turbine in which a plurality of wind turbine zones are defined, the control system comprising:
- for each of the plurality of wind turbine zones, at least one electromagnetic radiation sensor arranged to monitor the respective wind turbine zone; and,
- a controller comprising:
  - an input configured to receive sensor data from the electromagnetic radiation sensors;
  - a processor configured to: for each of the plurality of wind turbine zones,
    - using the received sensor data, determine whether one or more people are in the respective plurality of wind turbine zones; and,
    - control the wind turbine to operate in a first operational mode when it is determined that one or more people are in at least one of the plurality of wind turbine zones, the first operational mode configured such that no electrical power is being produced by the wind turbine, and
    - control the wind turbine to operate in a second operational mode when a change is determined from one or more people being in at least one of the plurality of wind turbine zones to no people being in any of the plurality of wind turbine zones, the second operational mode being configured such that the wind turbine generates electrical power; and
  - an output configured to transmit a control signal to control the wind turbine to operate in the first or second operational mode.

12. The control system according to claim 11, wherein the control system is a safety control system separate from a main control system of the wind turbine, the main control system being configured to control operation of the wind turbine in the absence of the output of the safety control system transmitting the control signal, and wherein when the output of the safety control system transmits the control signal upon determination that one or more of the wind turbine zones have one or more people therein, the safety control system is configured to assume controlling operation of the wind turbine from the main control system.

13. A wind turbine comprising the control system according to claim 11.

* * * * *